United States Patent Office 3,425,894
Patented Feb. 4, 1969

3,425,894
BINDERS FOR SHEET GLASS
Wolfgang Schafer and Reinhold Blass, Aix-la-Chapelle, Germany, assignors to Vereinigte Glaswerke Zweigniederlassung der Compagnie de Saint-Gobain, Aachen, Germany
No Drawing. Filed Sept. 10, 1965, Ser. No. 486,555
Claims priority, application Germany, Sept. 18, 1964, V 26,806
U.S. Cl. 161—203    12 Claims
Int. Cl. B32b 17/10; C09j 3/14

ABSTRACT OF THE DISCLOSURE

A glazing is provided which responds to increasing heat by becoming progressively obscure and vice versa. A polyvinyl caprolactam is the effective agent.

---

This invention relates to glazings which transmit light differently under different conditions of temperature or of radiation. The invention has several novel aspects but it will be described in its relation to the manufacture of sandwich glass, in which a sheet of novel material of differential transparency is sandwiched between thin sheets of window glass. Such glazings serve to control the admission of sunlight because their transparency is reduced as intensity of illumination increases. This particular description does not constitute a limitation on the generality of the application of the invention but serves as a particular illustration, applied to an important problem.

A number of substances are known to possess similar properties, but all of them have notable imperfections, and some of them act by different phenomena. Those most often used have the property of variable transparency because of dissociation of their components at a certain temperature, or energy level, which reverses itself in cooling. Among such compositions are certain high polymers combined with water which transform themselves from the gel to the sol state and vice versa as they pass through a particular temperature range. Examples are polyvinylmethyl ether, methyl cellulose, polyglycolic ether, the polyvinyl actals, polyvinyl alcohols partially acetalized by acetaldehyde, and methyl polyacrylates, all containing water. They have a limited capacity to absorb water, which is reduced as the temperature rises until, when a temperature of equalibrium is passed, the water separates out as a phase of microscopic droplets, the aspect of the piece becomes a white which is the more intense as the difference between the indexes of refraction of the two phases is the greater, as the dissociation is the more complete, and as the mixture of different phases is the finer.

In the prior art of glazing a preferred structure has employed an intermediate layer of polyvinyl alcohol which has been partly acetalized, water, and some calcium chloride. It has been essential to regulate the water content of the mixture exactly, other wise the point of transition is not reproducible; this requires a rigorously controlled process of climatizing the interlayer after it has been applied to the first glass sheet. In practice the polyvinyl acetal has been dissolved in an excess of water and alcohol, producing a viscous mass which is poured onto one glass sheet and levelled. It is then carefully dried, but as the drying must be done at low temperature (circa 40° C.) to prevent the formation of a hardened outer layer, the drying requires about 12 hours. When this stage has been completed the coated glass is moved into a climatized chamber having conditions about 20° C. and 80–90% humidity depending upon the composition of the resin, the amount of calcium chloride and the transition point provided for. The coated glass is exposed to this condition for a period of 24 to 72 hours. The open face of the interlayer is then plasticized by moistening it with a standard plasticizer for this resin and the plasticized face is joinned to the second glass plate. Finally, the edges are sealed hermetically, so far as possible to prevent the ingress or egress of water.

That process has other imperfections. The polyvinyl acetal composition is made only in small lots, by a difficult process, and is costly. The careful climatizing entrains large capitalization, much power, and numerous labor charges. The edge seal must prevent any passage of moisture, but is rarely so perfect, and when it is not the water content of the interlayer varies and with it the point of transition, and the transparency of parts of the plate. A true sealing can be accomplished only with much care and is quite expensive to obtain.

Another imperfection of the prior art is the appearance of bubbles in the interlayer, which increase in number and size with time. Because such bubbles appear it has been necessary to subject the acetal composition before spreading on the glass sheet to careful and costly evacuation, using ultrasonic means in some cases, but even the most careful evacuation is not always successful. There is also the possibility of the formation of a crystalline phase which may permanently obscure the glazing. The crystallization has been excessively difficult to cope with.

The primary object of this invention has been to prepare a novel, heat and light-sensitive glazing which is free from the objections ad imperfections listed above, which is more readily prepared with less proces difficulty, less labor, and less equipment. Another object is to prepare less costly glazings of this type. Another object is to minimize the problem of sealing the edges of the glazing. Other objects are to prepare a glazing by easy methods from a superior material which produces a superior interlayer and final product, at reduced cost.

The objects of the invention are accomplished, generally speaking, by the preparation of glazings the effective part of which comprises a polyvinyl caprolactam. The polyvinyl caprolactams are generally useful but will be exemplified by a single member of the class.

Other objects are to prepare polyvinyl caprolactam with a selected temperature of transition. This is achieved by a composition of polyvinyl caprolactam, water and a lower alkyl ester of glycolic acid. The water content of the solution may lie between about 35 and 80% by weight and that of the caprolactam between 65 and 20%. The content of ester will lie between 1 and 10%, normally, with 7% establishing a transition point about 22° C. The composition of preselected transition point includes, in addition to the lactam, a minor percent of the butyl ester of glycolic acid, and for many uses a few percent of a protective colloid. The content of colloid may lie from 0–2.5%. A 37% solution of caprolactam in water is satisfactory and the addition of methanol as an assistant in the process is useful. Such compositions have a temperature of transition of 30° to 40° C. For uses which require the onset of opacity at that temperature no other addition is required, but for use when a transition to opacity is to be initiated at a temperature of 20°–25° C., the transition point must be altered. Attempts to use the auxiliary agents which have altered the transition points of prior art interlayers, for example the alcohols, ketones, polyvinyl alcohol, and various salts have not been successful.

It is a part of the invention to use the lower alkyl esters, preferably the butyl ester, of glycolic acid to lower the transition point. That this is effective is surprising as the butyl ester is not water soluble, but it has proved to be wholly compatible with the water solution of the lactam interlayer. The transistion point is reduced as the ester is added. For an addition of 8% for example to a composition to which no protective colloid is added, the transistion point is at about 25° C. Mixing is very simple and the degassing (evacuation) of the mixture is rapid and complete at low vacuum, leaving a product which can be spread on a glass plate and will not generate bubbles. If bubbles are introduced during the spreading, they free themselves.

In a solution containing 1.5% stabilizing colloid, 37% caprolactam, and the remainder water the addition of 1% butyl ester lowered the transition point to 34.5° C.; 2% lowered it to 31.5° C.; 3% to about 29° C.; 5% to 24.5° C.; 6% to 23.4° C.; 4% to 26.5° C.; and 7% to 22.6° C.

The viscosity of a 37% solution is low and it is advantageous to the further processing to concentrate it by drying it to about 50–60% solids by weight. The point of transition varies somewhat according to concentration, so the composition should always be used at the same concentration when duplication of results is desired. For example, if our film of transition point 25° C. is to be dried on the first glass plate from 37% to 50–60% by weight, it can be dried at about 23° C., just below the transisition point, in 2.5 hours for a film .8 mm. thick. A variation in drying time of about 20 minutes will produce a variation in transition point not exceeding about .5° C. These are easy operating conditions of adequate precision.

In assembling the sandwich the bonding material is preferably applied to the upper layer of glass, rather than to the film of polyvinyl lactam, which is then applied to the lactam layer. Bonding agents are many and satisfactory but a superior bonding agent is a 1:1 mixture of glycerine and water. In many cases the bonding is achieve without pressure but presure may be applied if needed. The sandwich is allowed to rest until the bond is set, and then the edges are sealed by any sealing method appropriate to this art.

After transition, the light transmission of the rays of the vision spectrum has been tested for these glazings in comparison with prior art glazings of like thickness of interlayers, and have been found to have only 80% of the transparency of the prior art types; they are thus more efficient in obstructing the passage of such rays and of higher insulating value.

Prolonged exposure to heat as distinguished from radiation, for instance at 65° C., may produce a minute ripple effect in the interlayer but this does not appear below about 30–35° C. and disappears when the glazing is cooled. All such irregularities could be overcome by drying the sheet to a solid content higher than 75%, but this tends to raise the point of transition so far, that it becomes difficult to compensate it by adding the ester.

Any formation of irregularities of transparency in the interlayer may be avoided by adding a protective colloid to the batch mixture before spreading it. For instance, 1 to 2% of polyvinyl alcohol will prevent the appearance of defects in transparency. However, there is some incompatibility between the alcohol and the butyl ester which produces a special kind of opacity which is not always desirable. If the ester be omitted and the reduction of transition point attempted by increasing the content of polyvinyl alcohol other difficulties are entrained. We have discovered that such difficulties are avoided, and that the appearance of defects of transparency is prevented, if ammonium salts of polyacrylic acid be used as the protective colloid. They are available in water solution, are compatible with the caprolactam and the glycol ester, have no basic influence on the point of transition, and prevent irregularity in transparency. One or two percent by weight is a sufficient addition in most cases.

Example 1

920 g. of a 37% solution of polyvinyl-ε-caprolactam was mixed with 80 g. of the butyl ester of glycolic acid with agitation for about 10 minutes. The temperature of the mixture was not permitted to reach the transition point of the mixture which was, in this case, 24° C. The occluded air was removed from the mixture under vacuum of 100 mm. Hg in about 16 hours. The resultant mixture had a viscosity of about 70.000 cp. A horizontal glass plate was coated with a layer of the mixture to a thickness of about .8 mm., using a doctor blade, and dired in about 2½ hours to about 55% solids at a temperature of not over 27° C. The coated plate was washed with a 60–40 mixture of water and glycerine and a glass cover plate was applied. After 30 minutes the adhesive was set. The cover glass was slightly smaller than the base glass, leaving an exposed ring of lactam-ester. This was sluiced with water, dried by air, and sealed by a coat of epoxy resin. After the resin hardened it was tested for the transition point, which was at 25° C. It becomes turbid spontaneously at this temperature without undergoing a gradual transition from transparent to opaque.

Example 2

The process of Example 1 was carried out, except that sealing was accomplished by means of a thiokol resin. The results were the same.

Example 3

The process of Example 1 was followed except that the glazing was fixed in a metal window frame and sealed in place by the resin.

Example 4

850 g. of a 37% aqueous solution of the caprolactam of Example 1 was mixed with 50 g. of the butyl ester of glycolic acid with agitation for about 10 minutes. A second composition is produced by mixing of 97.75 g. of water and, as a stabilizing colloid, 2.25 g. of the ammonium salt of polyacrylic acid, with agitation for 2 hours. This second composition had a viscosity of 300–500 cp. and was intermixed with the first mixture of caprolactam and ester by vigorous agitation. The resulting mass had a viscosity of 60,000 cp. and was stripped of air under vacuum of 100 mm. Hg. It was applied to a glass plate as in Example 1, dried below 27° C. for 6–7 hours to a solids content of 65–75% and covered with glass. The transition range was 24–27° C., the turbidity taking place slower and not at a certain temperature but over a range of some degrees, as a consequence of the addition of the stabilizing colloid.

Example 5

Proceeding as under Example 4, the content of the ester was reduced from 50 to 35 grams. The content of the caprolactam was raised to 865 g. The transition range was between 31° and 33° C., the other steps being substantially the same.

In place of the butyl ester of glycolic acid one may also use the propyl, isopropyl, and amyl esters, which are adequately representative of the lower alkyl esters of glycolic acid.

The objects of the invention have been accomplished with the establishment of superior differential glazings of superior properties and predetermined points of transition by a novel method.

As many apparently widely different embodiments of the present invention may be made without departing from the spirit and scope thereof, it is to be understood that the invention is not limited to the specific embodiments.

What is claimed is:

1. A thermosensitive, reversibly transparent composition of matter consisting in its essential elements of an aqueous solution of polyvinyl caprolactam and a lower alkyl ester of glycolic acid the water content of the solution being from about 35 to about 80%, the caprolactam content being from about 65% to about 20%, and the content of the ester being from about 1 to about 10% by weight.

2. A composition according to claim 1 containing up to about 2.5% of a protective colloid, and in which lower alkyl is butyl.

3. A composition according to claim 2 in which the colloid is polyvinyl alcohol.

4. A composition according to claim 2 in which the colloid comprises an ammonium salt of polyacrylic acid.

5. Multilayer glass sheet comprising two glass plates and, interposed between said plates, an intermediate thermoreversible layer having a transition point from about 20° C. to about 50° C., said intermediate layer being substantially transparent below about 20° C. and, on increase in temperature, becoming thermoreversibly opaque at a temperature of about 20–50° C., said intermediate layer consisting of a film of a solution of a water-soluble form of a polyvinyl caprolactam in water, the polyvinyl caprolactam content lying between 20 and 80% by weight.

6. Multilayer glass sheet according to claim 5 with a transition temperature of about 32°–20° C., the intermediate layer consisting of a film of an aqueous solution of water-soluble form of a polyvinyl caprolactam, the caprolactam content lying between 50 and 75% by weight, and, incorporated in said film, a lower alkyl ester of glycolic acid in amounts of 0–10%.

7. Multilayer glass sheet according to claim 6 in which the lower alkyl ester of glycolic acid is butyl ester of glycolic acid.

8. Multilayer glass sheet according to claim 6 characterized in that in the intermediate layer is incorporated a stabilizing colloid in amounts of 0–2.5%.

9. Multilayer glass sheet according to claim 8 wherein the stabilizing colloid is polyvinyl alcohol.

10. Multilayer glass sheet according to claim 8 wherein the stabilizing colloid is ammonium salt of polyacrylic acid.

11. Multilayer glass sheet according to claim 5 characterized in that the polyvinyl caprolactam is polyvinyl-ε-caprolactam.

12. The method of producing a thermoresponsive multilayer glass sheet comprising two glass plates and, interposed between said plates, an intermediate layer, said intermediate layer being substantially transparent and, on increase in temperature, becoming thermoreversibly opaque at a temperature of 20°–50° C., the method consisting of preparing a mixture of 20–65% by weight of polyvinyl-ε-caprolactam, 35–80% by weight of water, 0–10% of butyl ester of glycolic acid and 0–2.5% of a stabilizing colloid comprising ammonium salts of polyacrylic acid, the mixture having a viscosity of about 70,000 cp., coating a glass plate with a layer of this mixture to a thickness of about 0.5–1 mm., drying the layer at a temperature not over the transition temperature of the mixture up to a solids content of about 50–75%, applying a cover glass plate upon the layer by means of a contact fluid comprising a mixture of water and glycerine and sealing the edges of the multilayer glass sheet.

References Cited

UNITED STATES PATENTS

| 2,901,457 | 8/1959 | Stoner et al. | 260—29.6 |
| 3,061,569 | 10/1962 | Stoner et al. | 260—29.6 |
| 3,208,964 | 9/1965 | Valle | 260—29.6 |
| 3,244,658 | 4/1966 | Grosser et al. | 260—29.6 |
| 2,710,274 | 6/1955 | Kuehl. | |
| 2,978,372 | 4/1961 | Bergstedt et al. | 260—29.6 |

MURRAY TILLMAN, *Primary Examiner.*

J. W. SNOW, *Assistant Examiner.*

U.S. Cl. X.R.

260—29.6, 32.2; 117—124; 161—410; 252—300